Feb. 11, 1958      W. G. CLARK      2,822,892
BRAKE ADJUSTOR FOR INTERNALLY EXPANDING SHOE BRAKE
Filed Nov. 20, 1953
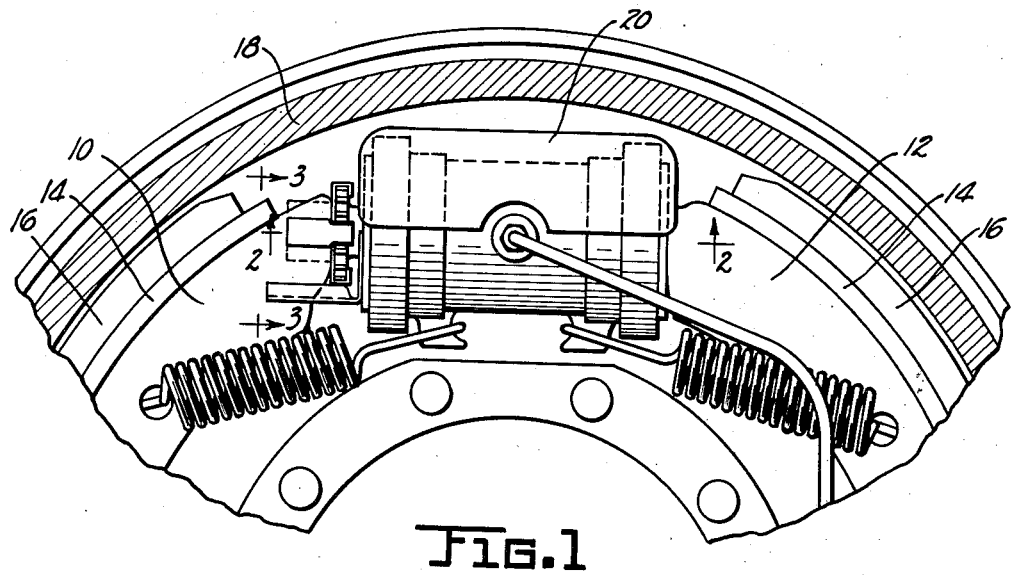
Fig.1
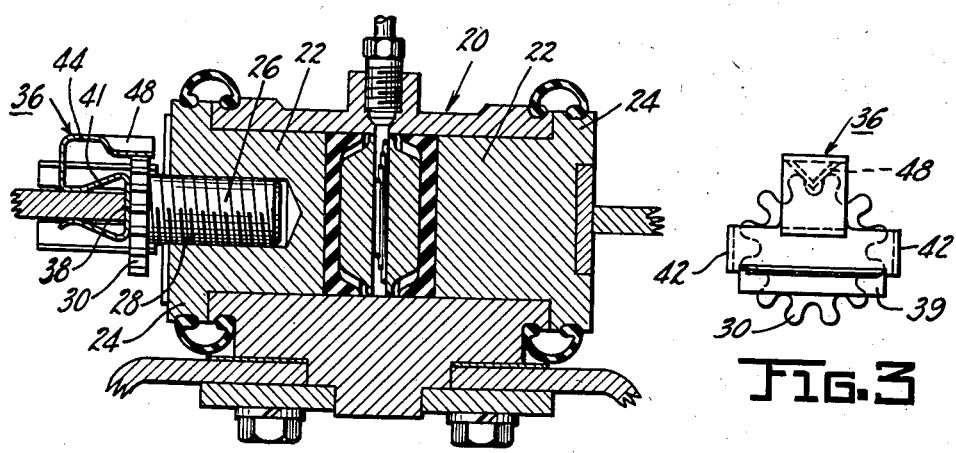
Fig.2
Fig.3
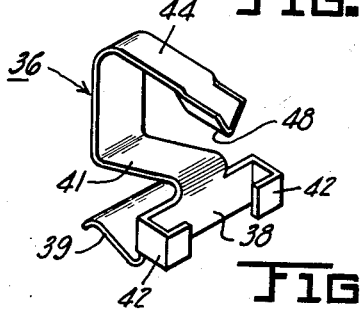
Fig.4
INVENTOR.
WARREN G. CLARK
BY
ATTORNEY

United States Patent Office 2,822,892
Patented Feb. 11, 1958

2,822,892

BRAKE ADJUSTOR FOR INTERNALLY EXPANDING SHOE BRAKE

Warren G. Clark, South Bend, Ind., assignor to Bendix Aviation Corporation, South Bend, Ind., a corporation of Delaware Application November 20, 1953, Serial No. 393,360

3 Claims. (Cl. 188—196)

This invention relates to a brake adjustor adapted for use with an internally expanding shoe type brake, the brake adjustor being designed to vary the retracted and/or anchored position of the brake shoes according to the extent of lining wear.

It is the principal object of the invention to provide a detent for the adjustor which will prevent movement thereof until it is manually adjusted by some appropriate tool inserted through an opening in the brake assembly.

A further object of the invention is to provide a detent which is inexpensive to manufacture, easily assembled, and reliable in performance.

Other objects and advantages of the present invention will become apparent from the following description of an illustrative embodiment, reference being had therein to the accompanying drawings, in which:

Figure 1 is a fragmentary view of a brake assembly incorporating the invention;

Figures 2 and 3 are section views taken on the lines 2—2 and 3—3 respectively of Figure 1; and Figure 4 is a perspective view of the detent.

Referring to the drawings, a pair of brake shoes 10 and 12 having rims 14 with friction material lining 16 thereon are actuated into engagement with a rotatable drum 18 by wheel cylinder 20.

The wheel cylinder 20 consists of a pair of oppositely acting pistons 22 provided with shoulders 24 limiting the retractile stroke of the pistons 22 to define the anchored and retracted position of the shoes 10 and 12. An adjustor 26 provided with a stem 28 threadedly received in one of the pistons 22 has a wheel 30 at the one end thereof against which the shoe 10 abuts in its retracted and anchoring position. The wheel 30 is formed with a serrated periphery permitting rotation of the adjustor 26 by a suitable tool inserted through an opening not shown in the brake assembly.

Positioned between the end of shoe 10 and adjuster 26 is a detent 36. The detent 36 is formed with a base 38 having two projections 39 and 41 which are bent back to engage opposite sides of the web 40. The two projections 39 and 41 prevent turning of the detent 36 when the adjustor 26 is rotated in either direction. The detent 36 has two arms 42 which are bent back at the extremities thereof to engage the underside of the serrated wheel 30. The two arms 42 stabilize the operative position of the detent 36 preventing both sliding of the detent with the brake shoe 10 and also twisting of the detent about either end.

The projection 41 has a resilient convolution 44 at the free end of which is a tooth 48 interdentally engaging the serrations of the wheel 30.

When a manual adjustment of the brake is made, the stem 28 is advanced in the piston 22 by turning of the wheel 30 until the lining 16 engages drum 18. The resilient convolution 44 permits the tooth 48 to ride up and over successive serrations on the periphery of the wheel 30 causing an audible click for each interdental engagement. Proper clearance of the lining 16 from an applied position is then established by backing the adjustor off, equating the number of clicks caused by engagement of the tooth 48 with successive serrations to the extent of retraction of the lining 16 from an applied position.

Although only a single embodiment of the invention has been illustrated and described it will be obvious that various modifications can be made to suit requirements without departing from the spirit of the invention.

I claim:

1. For use in combination with a member adapted to position a brake shoe in retracted position, an adjustor threadedly received in said member and provided with a wheel having a serrated periphery, a resilient detent consisting of a positioning portion adapted for mounting the detent, said positioning portion comprising two spreadable arms, means joining said spreadable arms and adapted to be interposed between said adjustor and the brake shoe to be the bearing surface therebetween, two transverse arms bent back at the extremities thereof to engage the underside of the wheel, said transverse arms being fitted around the serrated wheel periphery with slight clearance therebetween permitting unrestricted relative rotation of said wheel, projection means formed integrally with the positioning portion of said detent which extends rearwardly from said wheel and is turned back and a tooth constructed at the terminus of said projection and extending into abutting contact with an interdental segment of said wheel, said tooth yieldably engaging the periphery of the wheel with a force determined by the construction of said projection.

2. For use in combination with a member adapted to position a brake shoe in retracted position, an adjustor provided with a stem threadedly received in said member and a wheel with a serrated periphery, said stem being movable within said member so as to be limited only by said wheel and a spring-steel detent consisting of a portion for mounting said spring-steel detent, said mounting portion comprising two spreadable arms for yieldably fitting over the web of the brake shoe so as to be positioned thereby, means joining said spreadable arms and adapted to be interposed between the brake shoe and said wheel to provide a bearing surface therebetween, two laterally extending arms engaging one side of the wheel and bent back at the extremities thereof to engage the other side of the wheel, said laterally extending arms embracing said wheel with only slight clearance therebetween which permits the stem to be received in said member without interference from said arms, said arms having slight clearance with respect to the wheel to also permit relative rotary movement of the wheel, means projecting from one of said spreadable arms rearwardly from the serrated wheel and then toward said wheel, and a tooth at the terminus of said projection which extends into abutting contact with the periphery of the wheel to interdentally engage the serrated periphery of the wheel with a spring rate tending to resist rotation of said wheel.

3. In combination with a rotatable member having a transverse circular member with a serrated periphery, a locking member for yieldably preventing accidental rotation of said rotatable member, said locking member comprising two clasping portions which are urged apart to mount the locking member independently of said rotatable member, means joining said clasping portions and lying flatly against the face of said transverse circular member, a projection formed integrally with one of said clasping portions, said projection being constructed to extend upwardly and then toward the circular member, a detent formed at the end of said projection which engages the serrated periphery of said circular member with a force determined by the cantilever support of said projection, and a U-shaped cross section extension formed on either side of the locking member to loosely bracket said circular member, said extensions being dimensioned to permit unrestricted rotation of the circular member and without interference with longitudinal movement of the circular member.

References Cited in the file of this patent

UNITED STATES PATENTS

| | | |
|---|---|---|
| 831,405 | Barkley | Sept. 18, 1906 |
| 985,184 | Lee | Feb. 28, 1911 |
| 1,081,499 | Hall et al. | Dec. 16, 1913 |
| 1,090,662 | Vilkie | Mar. 17, 1914 |
| 2,177,865 | Collon | Oct. 31, 1939 |
| 2,536,410 | Anderson | Jan. 2, 1951 |